United States Patent [19]

Ayers et al.

[11] 4,178,439
[45] Dec. 11, 1979

[54] SULPHATED ION EXCHANGER AND METHOD FOR PREPARATION THEREOF

[75] Inventors: John S. Ayers; David R. Husbands, both of Palmerston North, New Zealand

[73] Assignee: Development Finance Corporation of New Zealand, Wellington, New Zealand

[21] Appl. No.: 773,269

[22] Filed: Mar. 1, 1977

[30] Foreign Application Priority Data

Mar. 4, 1976 [NZ] New Zealand .......................... 180198

[51] Int. Cl.² .......................... C08B 5/14; C08B 7/00; C08B 37/02; C08B 37/04
[52] U.S. Cl. .......................................... 536/59; 536/1; 536/3; 536/57; 536/92; 536/106; 536/112
[58] Field of Search ........................ 260/2.1 R, 2.2 R; 536/59, 57, 92, 106, 1, 112, 3

[56] References Cited

U.S. PATENT DOCUMENTS

| | | | |
|---|---|---|---|
| 2,511,229 | 6/1950 | Thomas | 536/59 |
| 2,962,454 | 11/1960 | McRae et al. | 260/2.2 R |
| 3,507,855 | 4/1970 | Whistler | 536/59 |
| 3,573,277 | 3/1971 | Grant | 260/2.2 R |
| 3,624,069 | 11/1971 | Schweiger | 536/59 |
| 3,637,657 | 1/1972 | Morii et al. | 536/59 |
| 3,651,041 | 3/1972 | Schell et al. | 260/2.2 R |
| 3,651,043 | 3/1972 | Schell et al. | 260/2.1 R |
| 3,720,659 | 3/1973 | Guiseley et al. | 536/2 |
| 3,726,796 | 4/1973 | Schweiger | 536/59 |
| 3,800,797 | 4/1974 | Tunc | 536/59 |
| 3,842,061 | 10/1974 | Anderson et al. | 424/101 |
| 3,872,060 | 3/1975 | Burke | 536/59 |
| 3,904,601 | 9/1975 | Tessler et al. | 536/106 |
| 3,920,625 | 11/1975 | Anderson et al. | 536/59 |

*Primary Examiner*—Ronald W. Griffin
*Attorney, Agent, or Firm*—Holman & Stern

[57] ABSTRACT

The invention relates to a novel sulphated cationic ion exchanger and to a method for preparation thereof. In addition it relates to a method of improving the capacity of an exchange matrix to receive sulphated groups. Although the general attraction of sulphate groups to proteins is known we have found that sulphated ion exchangers selectively bind lipoproteins in blood serum or plasma under suitable conditions. We have also discovered that when hydroxyalkyl groups are introduced into the ion exchanger matrix its capacity for taking up sulphate groups is unexpectedly increased. A method of use of the ion exchanger is also described.

16 Claims, 4 Drawing Figures

1

SULPHATED ION EXCHANGER AND METHOD FOR PREPARATION THEREOF

BACKGROUND OF THE INVENTION

1. Field of Invention

This invention relates to a cationic ion exchanger whose ion exchange capacity is provided by sulphate groups and to a method for preparation thereof.

2. Description of the Prior Art

Ion exchangers have been known to serve a practical utility in separating components out of fluid mixtures. Exchangers have been developed to allow the chromatographic separation of high molecular weight polyelectrolytes such as proteins (Journal of the American Chemical Society. Vol. 78, 1966, pp 751–755) and to selectively withhold one component from a mixture of macromolecules, such as albumin on QAE-Sephadex from all other serum proteins. Such ion exchangers commonly have attached to them carboxylic or sulphonic acid groups or salts thereof, an amino group or a quaternary amino group.

Ion exchangers operate on charge-charge relationships and, are not normally expected to be particularly selective in separating species of similar charge within a fluid mixture.

It is known that sulphate groups have a strong interaction with proteins. We have now found unexpectedly that sulphated cationic ion exchangers have a selective affinity for lipoproteins in blood serum.

Fractional separation of the various species of proteins in blood plasma or serum is of considerable medical and commercial importance. Methods of isolation of any one of the plasma or serum proteins, however, is hindered by a variety of technical problems, a major one being the presence of sizable amounts of lipoproteins. These are not easily removed selectively, particularly on a large scale.

Thus an ion exchanger which selectively removes lipoproteins and which has a high flow capacity would be a highly desirable product and promote economies in processes for recovering protein species from plasma or serum.

In addition, the quantisation of lipoproteins in human blood is of considerable medical interest. Elevated plasma lipoprotein concentration is frequently a secondary phenomenon associated with primary diseases such as diabetes mellitus, hypothyroidism, heavy proteinuria and obstructive jaundice. In addition, data suggest a direct correlation between plasma lipoprotein concentration and the incidence of clinical coronary artery disease. An ion exchanger which allows for a simple method of testing for elevated lipoprotein concentration is thus highly desirable.

We have found that we can prepare a sulphated ion exchanger using known ion exchange matrices and known sulphating agents. The extent of the sulphation of such an ion exchanger is satisfactory for the acceptable recovery of lipoproteins. We have found that the degree of sulphation can be enhanced without concurrent loss in flow rate capacity by the addition of hydroxy lower alkyl group to the matrix prior to the step of sulphation.

It is an object of this invention to provide a sulphated ion exchanger with a capacity for selectively absorbing lipoproteins or at least to provide the public with a useful choice.

SUMMARY OF THE INVENTION

Accordingly, the invention may be said broadly to consist in a cationic ion exchanger comprising a water insoluble, hydrophilic water swellable matrix; a plurality of sulphate groups chemically bonded to said matrix, the ion exchange capacity of said exchanger being provided by said sulphate groups; said matrix comprising, either;

(a) a cross-linked carbohydrate;
a cross-linked polysaccharide or hydroxyl containing derivative thereof, excluding starch, or a cross-linked cellulose in any one of its native fibrous, microgranular, microcrystalline, or regenerated forms, or, (b) a cross-linked carbohydrate, a cross-linked polysaccharide or hydroxyl containing derivative thereof, or a cross-linked cellulose in any one of its native fibrous, microgranular, microcrystalline or regenerated forms, a plurality of hydroxy lower alkyl groups being chemically bonded to said carbohydrates, polysaccharide, polysaccharide derivative or cellulose.

The invention may also be said broadly to consist in a method for the preparation of a cationic ion exchanger which comprises sulphating either;

(a) a cross-linked carbohydrate; a cross-linked polysaccharide or hydroxyl containing derivative thereof, excluding starch, or a cross-linked cellulose in any one of its native fibrous, microgranular, microcrystalline, or regenerated forms, or, (b) a cross-linked carbohydrate, a cross-linked polysaccharide or hydroxyl containing derivative thereof, or a cross-linked cellulose in any one of its native fibrous, microgranular, microcrystalline or regenerated forms, a plurality of hydroxy lower alkyl groups being chemically bonded to said carbohydrate, polysaccharide, polysaccharide derivative or cellulose; with a suitable sulphating agent.

Methods of using the ion exchanger according to this invention are more particularly described and claimed in our United States Patent application Ser. No. 773,270 filed on even date herewith, now U.S. Pat. No. 4,096,136, issued June 20, 1978, entitled "A Method of Selectively Removing Lipoprotein from Blood Plasma or Serum." The specification and claims of the aforementioned application are hereby incorporated herein by reference.

DESCRIPTION OF THE PREFERRED EMBODIMENTS

The invention may be more particularly understood by having reference to the following examples wherein Examples 1 to 5 and 7 set out methods of preparing particular ion exchangers according to the invention. Example 6 relates to the preparation of an exchanger which has not been hydroxy-propylated for comparison as to the degree of sulphation. Example 8 relates to the determination of the extent of sulphation. Example 9 is an examination of flow rates of the resin according to the invention and Examples 10 and 11 relate to adsorptive capacities of the resin according to the invention.

EXAMPLE 1

PREPARATION OF HYDROXYALKYL REGENERATED CELLULOSE

METHOD A: Preparation of Hydroxypropyl Regenerated Cellulose-10-50*

*10-50 refers to % (V/W based on cellulose) of epichlorohydrin and propylene oxide used in the preparation.

Granular regenerated cellulose (20 g) (75–125μ), with a moisture content of 5–7%, was mixed with cold 30% (W/V) aqueous sodium hydroxide (30 ml), 2 ml epichlorohydrin (10%V/W based on cellulose) and 10 ml propylene oxide (50% V/W based on cellulose). The mixture was stirred thoroughly until the cellulose had finished swelling and all the liquid had been absorbed. The damp cellulose was then placed in a container and sealed before heating it at 60° without further mixing. After 2 hours the reaction vessel was cooled to room temperature, opened and the contents were transferred into a large volume of stirred water (500 ml). The particles of hydroxylpropyl cellulose were collected on a Buchner funnel, washed well with water and finally dried by either method (i) or (ii) below. The product (20 g) was stored in a closed container until required for sulphation.

Drying Methods (i) The product was dewatered by solvent exchange into methanol through a graded series of methanol—water mixtures. Excess methanol was removed and then the product was heated at 60° C. under reduced pressure.

(ii) The product was freeze-dried. The last 1% moisture could be removed by air-drying at 60° C. without affecting the reactivity of the product.

Using this method hydroxypropylated regenerated celluloses can be prepared with a range of swollen volumes. Examples of these are given in Table 1. They were measured after the products had been dried by method (i).

TABLE I

Settled Bed Volumes of Hydroxypropyl Regenerated Celluloses in Water (ml/g)

| | | 6 | 8 | 10 | 20% epichlorohydrin |
|---|---|---|---|---|---|
| | 30 | 8 | 9 | 8.5 | |
| % Propylene | 50 | 12.5 | 11.0 | 9.5 | 8.1 |
| Oxide | 100 | 17.4 | 16.0 | 11.6 | 8.4 |

The yields of water insoluble product decreased as the amount of cross-linking decreased and with 1% epichlorohydrin only amounted to 40% of the initial weight of cellulose used. With 6, 8 and 10% they amounted to 84, 94 and 100% respectively.

METHOD B: Preparation of Hydroxyethyl Regenerated Cellulose

Granular regenerated cellulose (10 g) was suspended in 50 ml of toluene. To the suspension there was then added 10 ml of 60% aqueous sodium hydroxide followed by 8 ml of ethylene chlorohydrin and 0.5 ml of epichlorohydrin. The temperature of the mixture was then raised to 60° and the reaction allowed to proceed for 2 hours with agitation. After decanting the toluene, the product was dispersed in rapidly stirred water and collected on a sintered glass Buchner funnel. It was washed thoroughly with water, dewatered with acetone and dried under reduced pressure at 50° C. The product had a settled bed volume of 8 ml/g in water.

EXAMPLE 2

PREPARATION OF HYDROXYLPROPYL REGENERATED CELLULOSE SULPHATE (Na+FORM)

METHOD A

Hydroxypropyl regenerated cellulose-10-50 (1 g) dried by method (i) in Example 1 above, pyridine-sulphur trioxide complex (1 g) and dry pyridine (10 ml) were placed in an Erlenmeyer flask, protected with a drying tube and heated on an oil bath at 80° for 1.5 hours. The flask was shaken periodically by hand during the course of the reaction and then cooled before transferring the reaction mixture into 20 ml of deionized water. The sulphated product was collected on a sintered glass funnel and washed thoroughly with more deionized water. To convert it from the pyridinium to the sodium ion form it was titrated in 1 M sodium chloride with 0.1 M sodium hydroxide to a phenolphthalein end point and then recollected and washed on the filter again. The hydroxypropyl-regenerated cellulose sulphate had an ion exchange capacity of 2.37 meq/g. and a settled bed volume of 8.5 ml/g in water.

METHOD B 1 g of freeze-dried hydroxypropyl regenerated cellulose-8-50, pyridine-sulphur trioxide complex (2 g) and dry dimethylformamide (10 ml) were placed in a tube, stoppered and gently shaken at 20°–25° for 2 hours. The sulphated product was obtained as described in (A) above and had ion-exchange capacity of 4.3 meq/g. and a settled bed volume of 12 ml/g in water. Capacities up to 5.5 meq/g were obtained by this method by using up to 4 g of pyridine-sulphur trioxide complex and reaction times up to 4 hours.

The sulphated product was stored in deionized water in the presence of 0.025 sodium azide as preservative, for 6 months at 25° C. without detachable loss of sulphate groups. The product may also be dewatered by solvent exchange into e.g. methanol and dried under reduced pressure at 20° C. without affecting its ability to reswell on wetting and its ability to bind lipoproteins. The yield of product was greater than 98% allowing for the increase in weight resulting from the introduction of the charged groups (-OSO$_3$−Na+) in place of hydroxyls.

EXAMPLE 3

PREPARATION OF HYDROXYPROPYL CELLULOSE

Microgranular cellulose (20 g) (Whatman Cellulose Powder CC31 from W & R Balston Ltd., England) was mixed with cold 20% (W/V) aqueous sodium hydroxide (30 ml), epichlorohydrin (2 ml) and propylene oxide (10 ml). After the reactants had been thoroughly mixed in, the damp powderly cellulose was enclosed in a container and left at 20° C. for 24 hours. It was then transferred into 4 liters of stirred water. The product was washed, dewatered and dried in the same way as the hydroxypropyl regenerated cellulose (Example 1A) to give 18.7 g of product with a settled bed volume of 7.6 ml/g in water.

EXAMPLE 4

PREPARATION OF HYDROXYPROPYL CELLULOSE SULPHATE (Na+FORM)

This was accomplished in the same way as set out in Example 2A using hydroxypropyl cellulose prepared as in Example 3. By using 0.5, 1 and 2 g of pyridine-sulphur trioxide complex products were obtained with ion-exchange capacities of 0.56, 2.24 and 4.31 meq/g respectively.

EXAMPLE 5

PREPARATION OF HYDROXYPROPYL DEXTRAN SULPHATE (Na+FORM)

Dry hydroxypropyl cross-linked dextran (1 g) (Sephadex LH-20, from Pharmacia Fine Chemicals AB, Sweden), pyridine-sulphur trioxide complex (2 g) and dry pyridine (10 ml) were placed in an Erlenmeyer flask protected from atmospheric moisture with a drying tube and heated on an oil bath at 80° for 1.5 hours. The flask was shaken periodically during the course of the reaction and then cooled before transferring the reaction mixture into 200 ml of deionized water. The sulphated product was collected on a sintered glass funnel and washed thoroughly with more deionized water. It was finally neutralized with 0.1 M sodium hydroxide and then recollected and washed again on the filter. The cross-linked dextran matrix after sulphation had an ion-exchange capacity of 4.1 meq/g and a settled bed volume of 5.0 ml/g in water.

EXAMPLE 6

PREPARATION OF CROSS-LINKED DEXTRAN SULPHATE

Dry cross-linked Dextran (1 g) (Sephadex G-25, from Pharmacia Fine Chemicals AB, Sweden) was sulphated in 10 ml of dry formamide with 2 g of pyridine-sulphur trioxide as described in Example 5. The product has an ion-exchange capacity of 2.47 meq/g and a settled bed volume of 8.3 ml/g.

EXAMPLE 7

PREPARATION OF CROSS-LINKED AGAROSE SULPHATE

An aqueous slurry of cross-linked agarose (Sepharose CL-6B from Pharmacia Fine Chemicals AB, Sweden) was transferred to a sintered glass Buchner funnel and the excess water was removed by suction. 15 g of the moist agarose was exchanged into DMF through a graded series of DMF/water mixtures and finally washed with dry DMF. The CL-agarose beads suspended in DMF were then sulphated by adding 1.4 g of pyridine-$SO_3$ complex and gently shaking the mixture for 4 hours at 20°–25° C. The product after dispersion in deionized water was collected on a sintered glass Buchner funnel, washed thoroughly with deionized water. On titration it was found to contain 5.4 mmoles of sulphate groups (3.1 meq/g). This ion exchanger was found to bind 5.2 mg of cholesterol/g when tested with lipoprotein solution as described in Example 11 below.

EXAMPLE 8

DETERMINATION OF THE EXTENT OF SULPHATATION (ION EXCHANGE CAPACITY)

The extent of sulphation was determined from the volume of 0.1 M sodium hydroxide used to neutralize the pyridinium ion displaced from the sulphated matrix and by assuming a 100% yield of matrix from the reaction. The validity of this was shown in many cases where the product was dried. The yield was greater than 98% of that calculated from the weight of matrix used and the number of -$OSO_3Na$ groups introduced in place of hydroxyl groups. This method of analysis was further verified by a sulphur analysis on the dried product.

| COMPARISON OF ANALYSIS METHODS | | |
|---|---|---|
| meq/g (by titration) | % Sulphur (calculated) | % Sulphur (micro analysis) |
| 1.42 | 4.55 | 4.65 |
| 3.67 | 11.75 | 11.61 |

EXAMPLE 9

The flow rates measured for several of the sulphated matrices were as follows:
Hydroxypropyl Regenerated Cellulose Sulphate (4.3 meq/g)
   Example 2B: 130 cm/hr
Hydroxypropyl Cellulose Sulphate (4.31 meq/g)
   Example 4: 32 cm/hr
Cross-linked Agarose Sulphate (3.1 meq/g)
   Example 7: 45 cm/hr In each case the bed depth was 10 cm and flow was maintained with a 70 cm hydrostatic pressure differential across the columns using 0.5 M NaCl as eluant.

Although granular regenerated cellulose itself and ion-exchangers prepared from it U.S. Pat. No. 3,573,277 granted Mar. 30, 1971) are known to have excellent flow rates when packed into a column, (240 cm/hr under the same conditions as described above) it is surprising that such high flow rates are still possible after the regenerated cellulose particles have been substituted with hydroxypropyl groups giving rise to softer and more swollen grains.

EXAMPLE 10

USE OF SULPHATED ION-EXCHANGERS

A column was packed with the ion-exchanger, hydroxylpropyl regenerated cellulose-8-50 sulphate (1 meq/g) prepared as herein described in Example 2A. It was equilibrated with one column volume of 0.5 M magnesium chloride containing 0.01 M sodium bicarbonate and adjusted to pH7.4. When serum diluted 1:1 with 1 M magnesium chloride and adjusted to pH7.4 with 0.1 M sodium hydroxide, was passed through the column two of the lipoprotein fractions, the very low density lipoproteins (VLDL) and the low density lipoproteins (LDL) were selectively and quantitatively removed. All other proteins including the third lipoprotein fraction, the high density lipoproteins (HDL) passed straight through the column and were washed out with a further column volume of the 0.5 M magnesium chloride (pH 7.4) solution as used initially to equilibrate the column. The lipoproteins (VLDL and LDL) bound to the column were eluted with a solution 0.25 M in sodium chloride and 0.25 M in trisodium citrate which had been adjusted to pH 8.4 with 1 M hydrochloric acid. (Alternatively these lipoproteins can be eluted rapidly with 1 M sodium chloride). The eluted lipoproteins were shown to be uncontaminated with other serum proteins by immunoelectrophoresis and agarose electrophoresis. Similarly the serum proteins which passed straight through the column were shown to be devoid of VLDL and LDL by immunoelectrophoresis and agarose electrophoresis.

The HDL fraction may also be retained on the column if a more highly substituted ion-exchanger is used, e.g. 3-5 meq/g but this is not always necessary as it is usually the LDL and VLDL which are the main cause of the trouble in serum protein fractionations. The flow rate of serum through the ion exchange column was such that the lipoproteins can be removed from 5 ml of serum inside a 15 minute period and also larger columns can be used still with good flow characteristics. Thus quite unexpectedly from previous methods of selectively removing the lipoprotein components from serum, the use of this ion-exchange achieved it quantitatively and with speed.

Consequently if such a procedure is used first, it can facilitate the isolation of other serum proteins. For example in the preparation of IgG from serum, all other proteins are adsorbed onto a column of QAE-Sephadex leaving IgG to pass straight through the column (Protides of the biological fluids; proceedings of the 17th Colloquim, 1969, p. 511-515). However the volume of diluted serum loaded onto the column cannot exceed 75% of the volume of the column or LDL's and VLDL's also break through the column and contaminate the IgG. By removing the LDL's and VLDL's first on a column of sulphated ion-exchanger and then carrying out the preparation of IgG as outlined in the references above, up to three times as much serum may be loaded onto the QAE-Sephadex column without contamination of the IgG being isolated.

EXAMPLE 11

LIPOPROTEIN BINDING CAPACITIES OF SULPHATED ION-EXCHANGERS

In order to measure the capacity of the sulphated ion-exchangers for binding lipoproteins each of them was packed in a Pasteur pipette to make a small column of volume 1.5 ml. Their lipoprotein binding capacities were determined using a low density lipoprotein fraction (VLDL plus LDL) prepared on the ultracentrifuge and thence dialyzed against 0.01 M sodium bicarbonate buffer, pH 7.4. The lipoprotein fraction was made up to its original serum volume with the same buffer and then diluted 1:1 with a solution containing sodium chloride, magnesium chloride and 0.01 M sodium bicarbonate adjusted also to pH 7.4 so that the diluted lipoprotein solution has a final salt concentration of 0.05 M and a magnesium chloride concentration of 0.5 M. The following method was used for each column.

The column was equilibrated with 10 ml of solution (A) containing 0.05 M sodium chloride, 0.5 M magnesium chloride, 0.01 M sodium bicarbonate and adjusted to pH 7.4. 5 ml of the lipoprotein solution was passed through the column and washed out with 5 ml of solution A followed by 2 ml of 0.01 M sodium bicarbonate buffer, pH 7.4. The lipoproteins were then eluted from the column with 1 M sodium chloride and collected in 2 ml. The cholesterol content of this 2 ml was determined as a quantitative measure of the amount of lipoprotein bound to the column. The ion exchanger in the column was finally washed and oven dried at 60° C. to determine its dry weight.

The results of capacity measurements of selected sulphated ion exchangers made in accordance with this procedure are set out in Table II.

TABLE II

| Sulphated Ion Exhangers | | Lipoprotein Capacity | |
|---|---|---|---|
| Matrix | | meq/g | mg cholersterol/g |
| Micrograular cellulose | -10-50 | 2.24 | 25 |
| " | 10-00 | 2.11 | 18 |
| " | 50-00 | 2.06 | 2 |
| Regenerated cellulose | -8-50 | 2.11 | 7.5 |
| " | 10-00 | low | not tested |
| " | 50-00 | 2.32 | 0.6 |
| " | 100:00 | 1.53 | 0.2 |
| Cross-linked dextran | LH-20 | 2.65 | 2.2 |
| | G-25 | 2.38 | 0.7 |
| Cross-linked agarose | | 3.1 | 5.2 |

The procedure was repeated using the serum from which the low density lipoproteins had been removed on the ultracentrifuge. This gave a measure of the ion exchanger's capacity for HDL as none of the other serum proteins bound under these conditions.

EXAMPLE 12

CELLULOSIC MATRICES

General

Cellulose was employed in its native fibrous, microcrystalline, microgranular or regenerated forms which was cross-linked and had attached hydroxyalkyl groups. The regenerated cellulose was obtained from either the xanthate or cuprammonium process in a variety of forms such as granular, powder or rounded beads produced by known methods.

e.g. Granular—by grinding dry rods, filaments, flakes, films, etc.
Powder—by spraying the cellulose solution into the regenerating bath (N.Z. Pat. No. 167,838).
Bead forms—by dispersing the cellulose solution into microdrops by vigorous stirring in the presence of an organic solvent immiscible with water before regeneration. (Journal of Polymer Science: Part C 36, 1971, page 280). (British Pat. No. 1,293,611).

The cross-linking agent used can in principle be any bifunctional compound of formula X-R-Y wherein X and Y are each halo or epoxy groups and R is an aliphatic residue. Typical cross-linking agents are set out herein below in Table III.

TABLE III epichlorohydrin,
dichlorohydrin,
dibromopropanol
1,2:3,4-diepoxybutane,
bis-epoxypropyl ether
ethylene glycol-bis-epoxproyl ether
1,4-butandiol-bis-epoxypropyl ether Cross-linking was achieved by reacting cellulose or regenerated cellulose in the presence of a base and water. Alkali metal hydroxides, primarily sodium hydroxide and potassium hydroxide, were used for the base. However other alkaline reacting substances such as quanternary ammonium compounds could also be used. The properties of the finished product depended on the degree of cross-linking used. This could be controlled in accordance with the final properties required. The degree of cross-linking was from 1 to 50%, but more especially from 4 to 20%, expressed in terms of the volume of cross-linking reagent to the dry weight of cellulose. It will be appreciated that the degree of cross-linking used in any given case will depend on the particular matrix used and the number of activating hydroxy alkayl groups substituted on to it. Levels of cross-linking above this range were sometimes required, for example, if the cross-linking was carried out prior to regeneration of the cellulose.

The hydroxyalkyl groups could be added to the cellulose or regenerated cellulose at the same time as the crosslinking was carried out by adding an alkyleneoxide or alkylenehalohydrin to the alkali metal hydroxide, water and cross-linking agent. For example hydroxypropyl groups could be added by the use of propylene oxide or propylene chlorohydrin and hydroxyethyl groups by using ethylene oxide or ethylene chlorohydrin. Preferably the amount used was between 20 and 200%.

The amount of water present in the reaction was sufficient to dissolve the base and swell the matrix, but not so great as to cause excessive side reactions with the hydroxyalkylating reagent. In order to minimize these side reactions, the reaction could be suitably carried out in the presence of a solvent not miscible with water, e.g. toluene. This solvent may also serve as a heat removing medium, and provide a more uniform distribution of the reactants as well as allow a higher reaction temperature to be used if one of the reactants is of low boiling point.

Alternatively in the case of regenerated cellulose, the cross-links and/or the hydroxyalkyl groups could be incorporated before the final regeneration of the cellulose by methods known in the art (N.Z. Pat. No. 167838).

BRIEF DESCRIPTION OF THE DRAWINGS

The invention may be more fully understood by having reference to the accompanying drawings wherein.

The FIGS. 1 and 2 are plots of the degree of sulphation expressed in meq/g against time for seven different samples of regenerated cellulose. The number labels, 100-0, etc. have the same meaning as explained in relation to Example 1.

Figure 3:
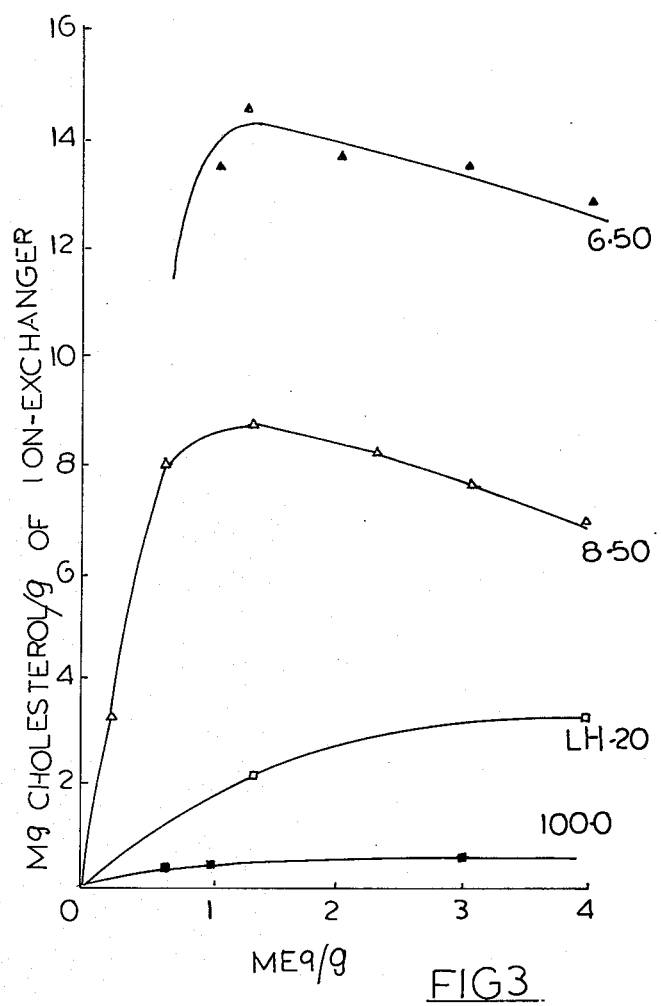
FIGS. 3 and 4 are plots of the adsorption capacity of the ion exchanger for low density and high density lipoproteins respectively, as explained in Example 11, against the extent of sulphation of the ion exchanger expressed as meq/g. The number labels 6-40 etc, have the meaning explained in Example 1. "LH-20" refers to Sephadex LH-20 sulphated as described in Example 5.
Figure 4:
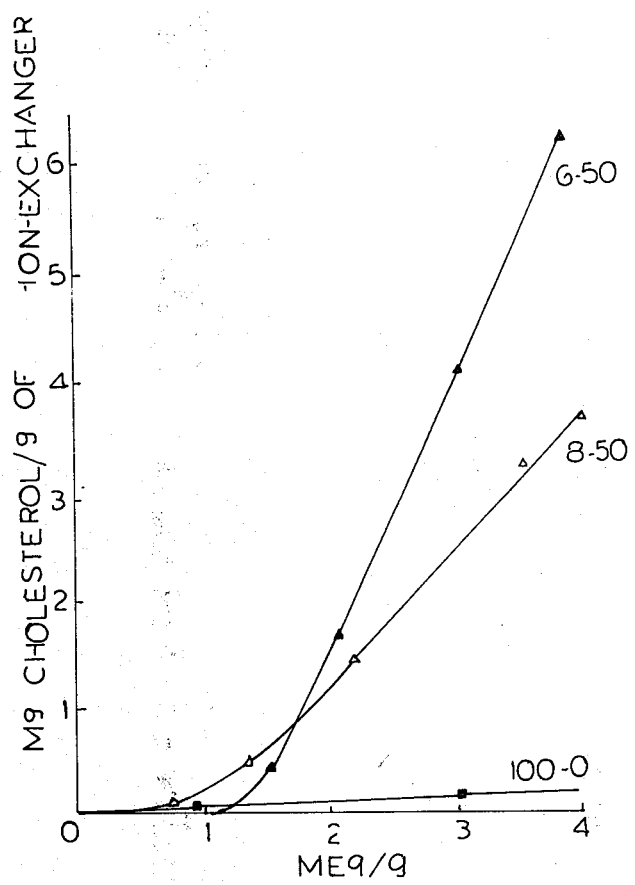

Although regenerated cellulose prepared using 50% and 100% could be sulphated satisfactorily it has inferior binding capacities for binding lipoproteins, especially when expressed in terms of the dry weight of sulphated ion-exchanger required (See FIGS. 3 and 4).

Figure 1:
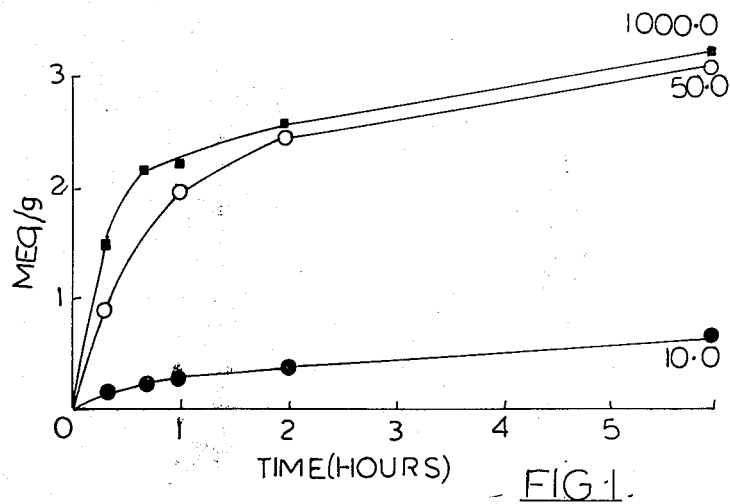
FIG. 1 shows that the reactivity of the cross-linked regenerated cellulose towards sulphation decreases as the amount of cross-linking decreases. Conditions of reaction are those given in Example 2A using 2 g of pyridine-sulphur trioxide complex. Similar reactivities were observed by presoaking in DMF for 16 hours and then carrying out the reaction in DMF at 20°–25° C.
Figure 2:
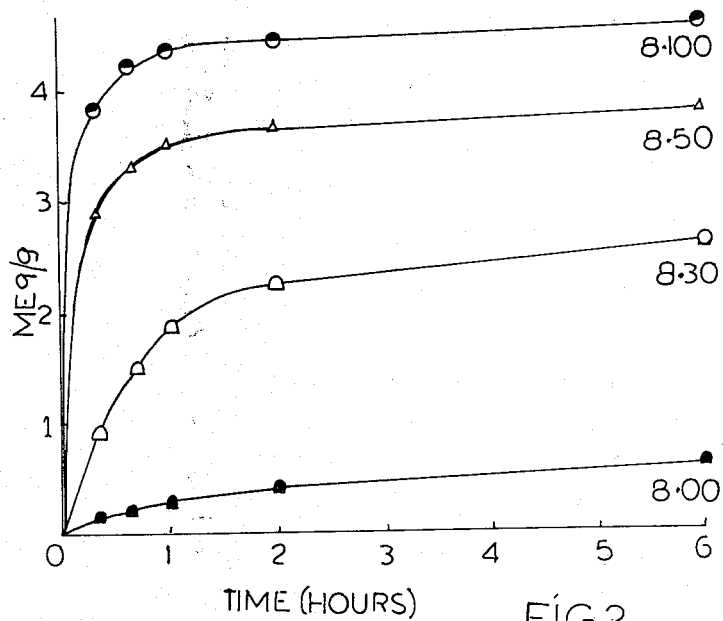

FIG. 2 shows how the reactivity of the cross-linked regenerated cellulose towards sulphation is dramatically improved by the presence of added hydroxypropyl groups. Conditions of reaction are those given in Example 2A using 2 g of pyridine-sulphur trioxide complex.

FIGS. 3 and 4 show the improved capacity of the sulphated ion-exchangers prepared from hydroxypropylated matrices compared with that obtained using high levels of crosslinking (100%) but no propylene oxide.

What we claim is:
1. A cationic ion exchanger comprising a water insoluble hydrophilic, water swellable matrix; a plurality of sulphate groups chemically bonded to said matrix, the ion exchange capacity of said exchanger being provided by said sulphate groups; said matrix being a member selected from the group consisting of:
    (a) a cross-linked carbohydrate, and,
    (b) a cross-linked carbohydrate having a plurality of hydroxy $C_a$–$C_4$ alkyl groups chemically bonded thereto.
2. The ion exchanger according to claim 1 wherein the degree of sulphation is at least 0.5 meq/g.
3. The ion exchanger according to claim 1 wherein said matrix is regenerated cellulose cross-linked with at least 50% epichlorohydrin expressed as volume epichlorohydrin to weight of cellulose.
4. The ion exchanger according to claim 3 wherein said matrix is regenerated cellulose cross-linked with at least 5% volume of epichlorohydrin to weight cellulose, there being present hydroxypropyl groups introduced by at least 30% propylene oxide expressed as volume propylene oxide added to weight of cellulose matrix.
5. The ion exchanger according to claim 1 wherein said cross-linked carbohydrate is a member selected from the group consisting of an unsubstituted cross-linked polysaccharide, an unsubstituted hydroxyl containing derivative thereof, a cross-linked polysaccharide substituted with a plurality of hydroxy $C_2$–$C_4$ alkyl groups and hydroxyl containing polysaccharide derivative substituted with a plurality of hydroxy $C_2$–$C_4$ alkyl groups.
6. The ion exchanger according to claim 5 wherein said cross-linked polysaccharide is a member selected from the group consisting of unsubstituted cross-linked cellulose in any one of its native fibrous, microgranular, microcrystalline or regenerated forms, and a cross-linked cellulose in any one of its native fibrous, microgranular, microcrystalline or regenerated forms substituted with a plurality of hydroxy $C_2$–$C_4$ alkyl groups.
7. The ion exchanger according to claim 6 wherein said matrix is microgranular or microcrystalline cellulose cross-linked with less than 25% of epichlorohydrin expressed as volume epichlorohydrin to weight of cellulose.
8. The ion exchanger according to claim 7 wherein said microgranular or microcrystalline cellulose is cross-linked with from 5–10% of epichlorohydrin expressed as volume epichlorohydrin to weight of cellulose.
9. The ion exchanger according to claim 1 wherein said cross-linked carbohydrate matrix is substituted to a degree of substitution produced by reaction of at least 20% volume of hydroxyalkylating agent to weight of the matrix.
10. A process for the preparation of a cationic ion exchanger which comprises the steps of:
    hydroxy $C_2$–$C_4$ alkylating a water insoluble, hydrophilic water swellable cross-linked cellulose selected from the group consisting of native fibrous, microgranular, microcrystalline and regenerated cellulose, said cellulose being further selected from the group consisting of unsubstituted cellulose and cellulose substituted by hydroxy $C_2$-$C_4$ alkyl groups; and sulphating the product of step 1.

11. The method according to claim 10 wherein said matrix is hydroxy alkylated by the addition of propylene oxide.

12. The method according to claim 10 wherein said sulphating agent is either the reaction product of sulphur trioxide and a Lewis Base or the reaction product of chlorosulphonic acid and a Lewis base.

13. A method to claim 12 wherein said sulphating agent is a pyridine sulphur trioxide complex.

14. The method according to claim 12 wherein said sulphating is conducted in dimethylformamide or formamide at a temperature of between 0° and 60° C. for from 0.5 to 6 hours, there being from 2 to 20 millimoles sulphating agent per gram of matrix and 5–25 ml of dimethylformamide or formamide per gram of matrix.

15. The method according to claim 12 wherein said sulphating is conducted in pyridine at a temperature of between 50° and 90° C. for from 0.5 to 6 hours, there being from 2 to 20 millimoles sulphating agent per gram of matrix and 5–25 ml of pyridine per gram of matrix.

16. The method according to claim 10 wherein said matrix is preswollen for from 0 to 16 hours prior to the addition of a sulphating agent.

* * * * *